June 1, 1965  F. F. BORKMANN ETAL  3,186,143
CARTON SEALING MACHINE
Filed Aug. 10, 1962  7 Sheets-Sheet 4

INVENTORS
FRANK FREDERICK BORKMANN
HUGO HERMAN KLUESENER
BY George P. Ziehmer
George W. Reiber
ATTORNEYS

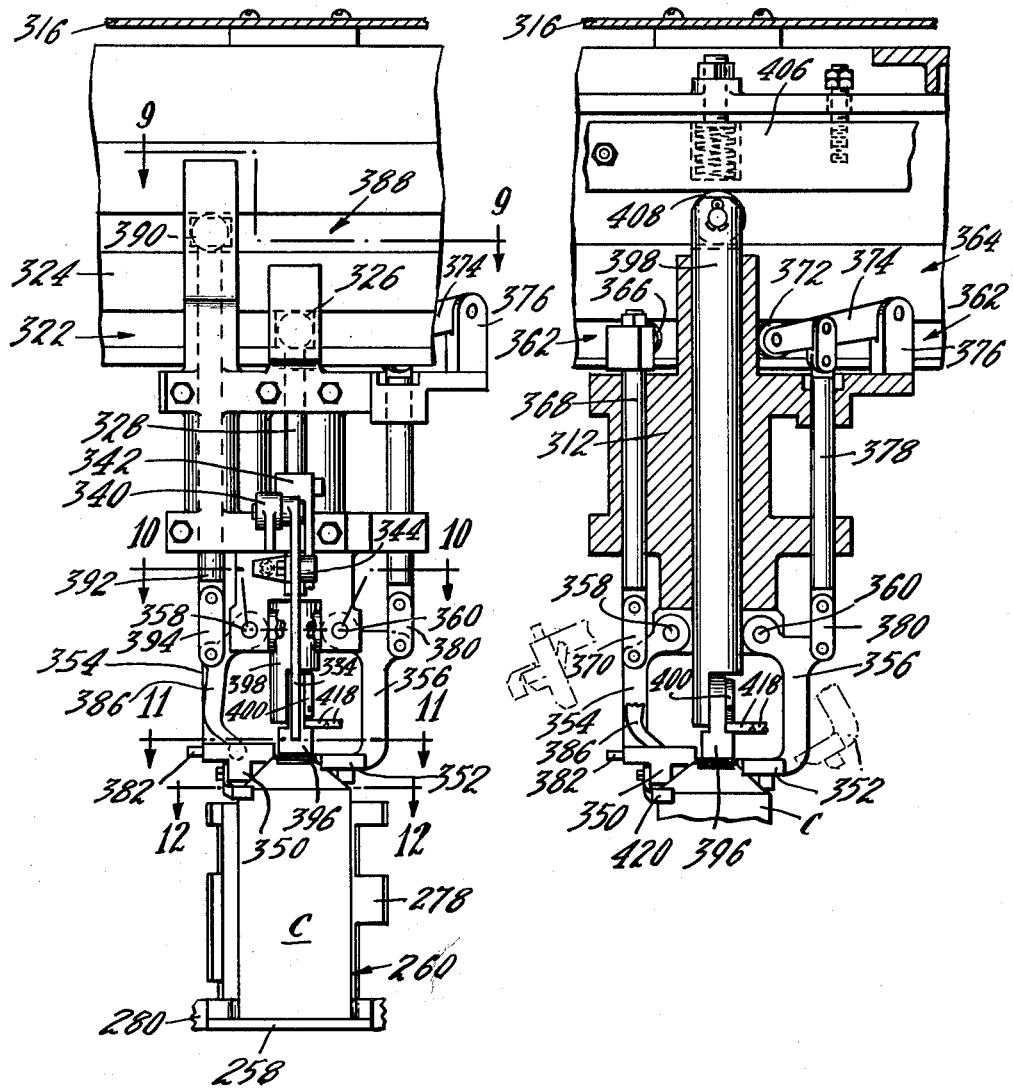

INVENTORS.
FRANK FREDERICK BORKMANN
HUGO HERMAN KLUESENER
BY
ATTORNEYS

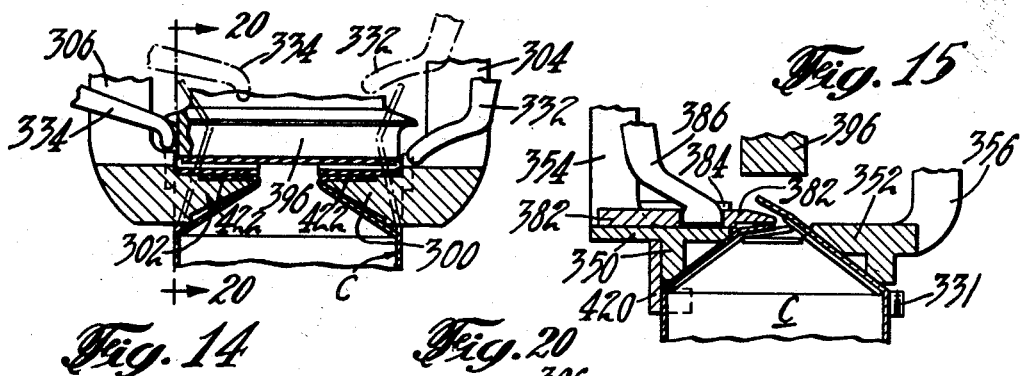
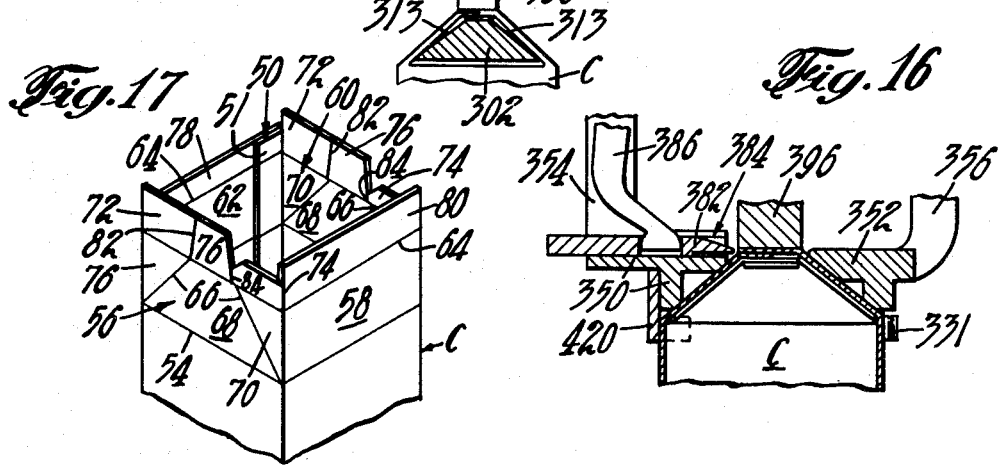
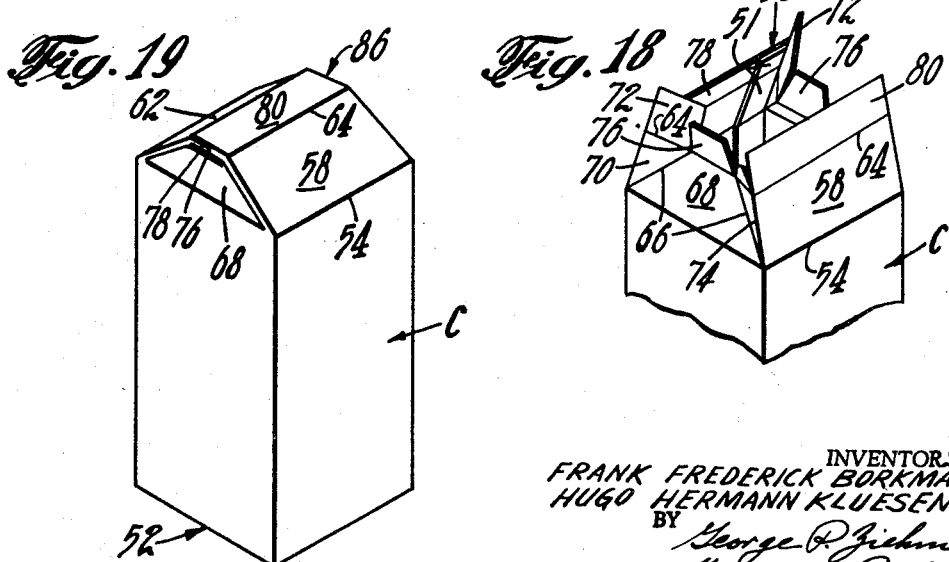

United States Patent Office 3,186,143
Patented June 1, 1965

3,186,143
CARTON SEALING MACHINE
Frank Frederick Borkmann, Union, and Hugo Herman Kluesener, Elizabeth, N.J., assignors to American Can Company, New York, N.Y., a corporation of New Jersey
Filed Aug. 10, 1962, Ser. No. 216,168
15 Claims. (Cl. 53—379)

The present invention relates to carton sealing machines and has particular reference to a machine for forming a top closure on a filled fibre carton which is formed with foldable top closure panels which carry a thermoplastic coating which is utilized as an adhesive.

A recent major development in the packaging industry has been the introduction of fibre milk cartons having all of their surfaces coated with a thermoplastic material such as polyethylene which provides a smooth, protective and highly attractive surface. One such carton is disclosed in United States Letters Patents 3,022,930 and 3,024,959, which are owned by the assignee of the instant invention and which cover a carton construction wherein the upper end of the carton is designed to provide an adhesively sealed gable type top closure which is completely liquidproof, yet which can be readily opened to provide a convenient pouring spout for the fluid contents of the carton. The present invention relates to machines which are adapted to form the top closures on cartons of the general type disclosed in these patents.

An object of the invention is the provision of a carton sealing machine designed to heat the protective thermoplastic coating on selected portions of the top closure panels of fibre cartons and to thereafter fold these panels to form them into a top closure which is sealed by the heated coating.

Another object is the provision of such a machine wherein the heating operation is performed by a heating head which is lowered onto the filled carton and which is designed to concentrate its heat on those portions of the top closure panels which are later pressed together to provide the seal in the finished closure.

Still another object is the provision in a carton sealing machine of a safety device of novel design which operates to remove the heating head from heating proximity to the carton in the event the machine is shut down to thereby prevent overheating and burning of the carton.

Another object is the provision in such a machine of novel folding devices which form the top closure panels of the carton into a gable type top.

Yet another object is the provision of such a machine wherein the heating and the folding operations are performed in separate rotary turrets, each of which contains a multiplicity of carton holding pockets to thus provide a single line machine which operates efficiently and reliably at high speeds.

Numerous other objects and advantages of the invention will be apparent as it is better understood from the following description, which, taken in connection with the accompanying drawings, discloses a preferred embodiment thereof.

Referring to the drawings:

FIG. 7 is a front elevation of a portion of the folding and sealing turret, the view being taken from the left hand side of FIG. 3, and showing one of the folding and sealing heads carried on the turret; parts being broken away;

FIG. 8 is a vertical section taken substantially along the line 8—8 in FIG. 3, parts being broken away;

Figure 13:
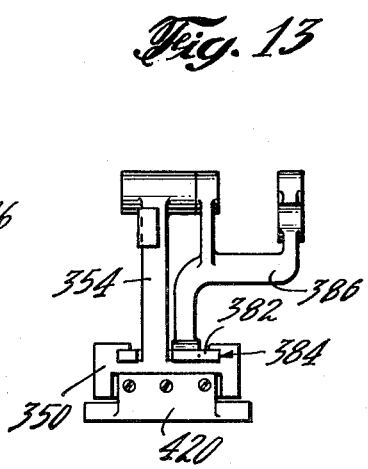
Figure 10:
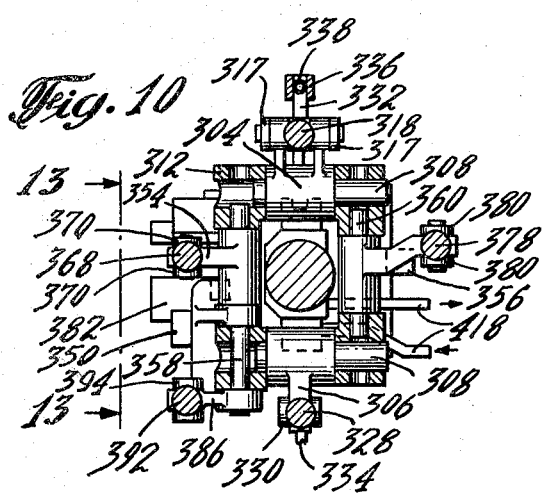
Figure 12:
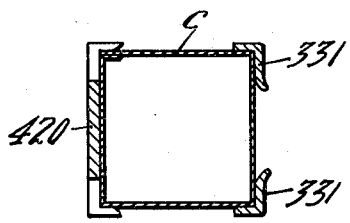
Figure 11:
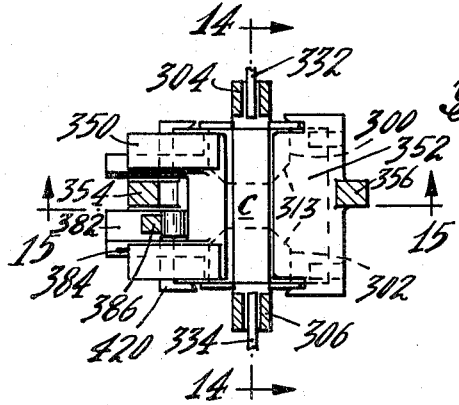

FIGS. 9, 10, 11 and 12 are sections taken substantially along the lines 9—9, 10—10, 11—11, and 12—12, respectively, in FIG. 7, parts being broken away;

FIG. 13 is a section taken substantially along the line 13—13 in FIG. 10; parts being broken away;

FIGS. 14 and 15 are sections taken substantially along the lines 14—14 and 15—15, respectively, in FIG. 11, parts being broken away;

FIG. 16 is a sectional view similar to FIG. 15 but showing various operating parts of the folding and sealing head at the completion of the folding and sealing operation;

FIG. 17 is a perspective view of the top end portion of a tubular carton prior to the folding of the top closure panels;

FIG. 18 is a view similar to FIG. 17 but showing the top closure panels after they have been partially folded along their crease lines;

FIG. 19 is a perspective view of a filled carton after it has been finally sealed by the instant machine, and FIG. 20 is a section taken substantially along the line 20—20 in FIG. 14.

As a preferred and exemplary embodiment of the instant invention, the drawings show a carton sealing machine which is adapted to form a liquid-tight top closure in fibre cartons C of the type disclosed in United States Letters Patent 3,022,930 and 3,024,959. These cartons C are preferably formed from a single piece fibre blank which has both its inside and outside surfaces coated with a thin film of a thermoplastic material such as polyethylene which serves to provide an attractive liquid and moistureproof coating.

The carton C is formed with a side seam 50 (see FIGS. 17 and 18) which is formed between an elongated narrow flap 51 which runs along one side of the body blank for its full height and is disposed in underlapped relationship to the marginal edge portion of the opposite side of the body blank and adhesively secured thereto. Prior to the time the carton C is received in the instant machine, it is set up into tubular form and its bottom closure flaps (not shown) formed into a liquid-tight bottom closure, generally designated by the numeral 52, in a machine which is separate from the machine of the instant invention, and has been filled with a liquid such as milk or a milk product, orange juice or the like which fills the carton C to a height which is substantially at the level of a circumferential crease or score line 54 which encircles the upper part of the body and sets off its four top closure panels 56, 58, 60 and 62 (see FIGS. 17, 18). For the sake of simplicity of illustration, the liquid in the carton C has been omitted from the drawings.

The top of the top closure panels 56, 58, 60, 62 is defined by a horizontal circumferential score or crease line 64 which extends completely around the carton C, and the opposed closure panels 56, 60 are subdivided by pairs of oblique score or crease lines 66 into trapezodial center sections 68 and triangular wing sections 70. The top edge of the carton above the crease line 64 is suitably notched to provide two long tabs 72, two short tabs 74, two free central tabs 76, a narrow underlap tab 78, and a wide overlap tab 80. The free central tabs 76 are set off from their surrounding tabs 72, 74 by cut lines 82, 84.

By virtue of this top construction, the top end portion of the carton C is adapted to be folded and sealed by the instant machine to form a gable top of novel construction which is generally designated by the numeral 86 (see FIG. 19). Because both the inner and outer surfaces of the fibre carton stock are coated with a thermoplastic material such as polyethylene, this polyethylene is utilized as a hot melt adhesive which seals the gable top 86 of the container and makes it leakproof.

Each filled carton C is conveyed to the instant machine by any suitable mechanism such as a belt conveyor 100 which operates around a drum 102 which is suitably mounted on a shaft 104 which is journalled in bearings 106 which are secured to the main frame 108 of the instant machine. The carton C is received on a top plate 110 secured to the main frame 108 and is advanced into engagement with a stop pin 112 by the pressure of the succeeding cartons C on the belt conveyor 100.

The timing of the machine is such that as the carton C engages the stop pin 112, it is engaged by and propelled around the inside of an arcuate guide rail 113 by an arm 114 of a constantly rotating feed spider 116 which is mounted on a vertical shaft 118 which is journaled in the machine frame 108, the shaft 118 being keyed at its lower end to a sprocket 120 which is rotated by an endless chain 122 which drives all of the other parts of the machine in synchronism, as will hereinafter be described.

Figure 1:
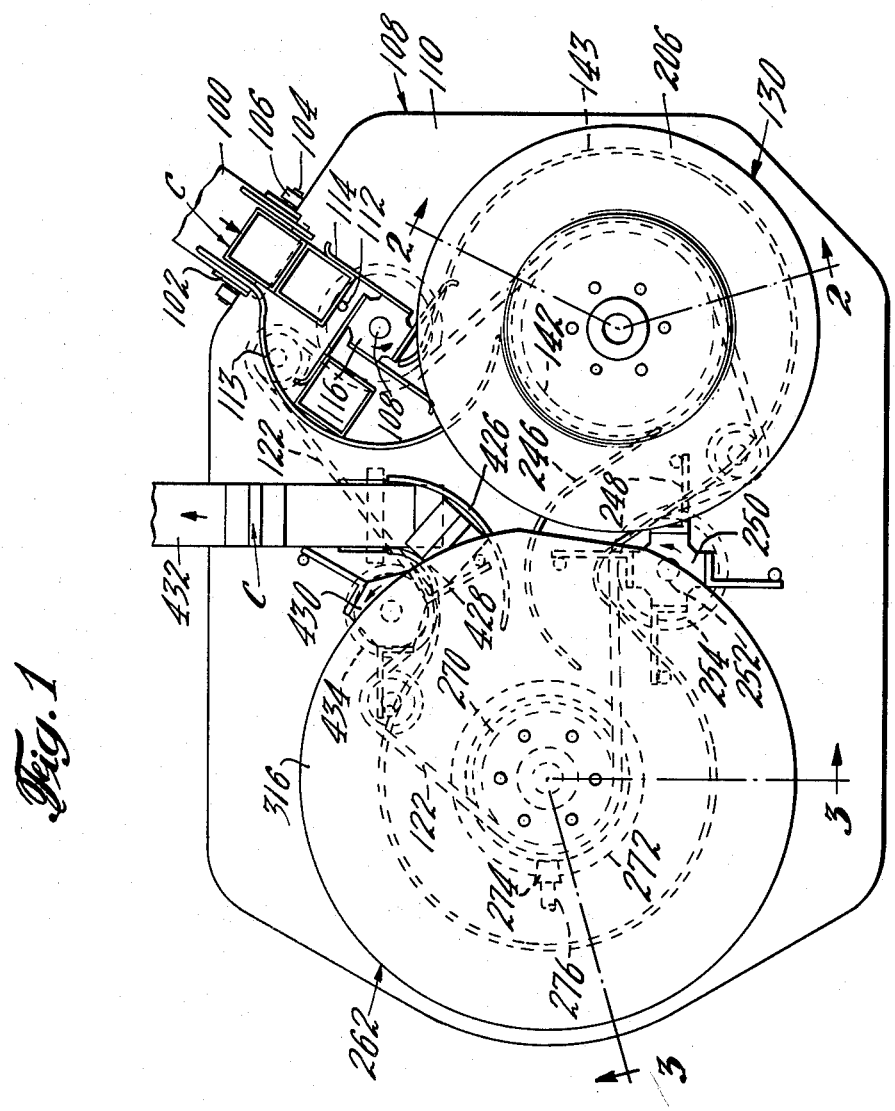
FIGURE 1 is a plan view of a carton sealing machine embodying the principles of the instant invention.
Figure 2:
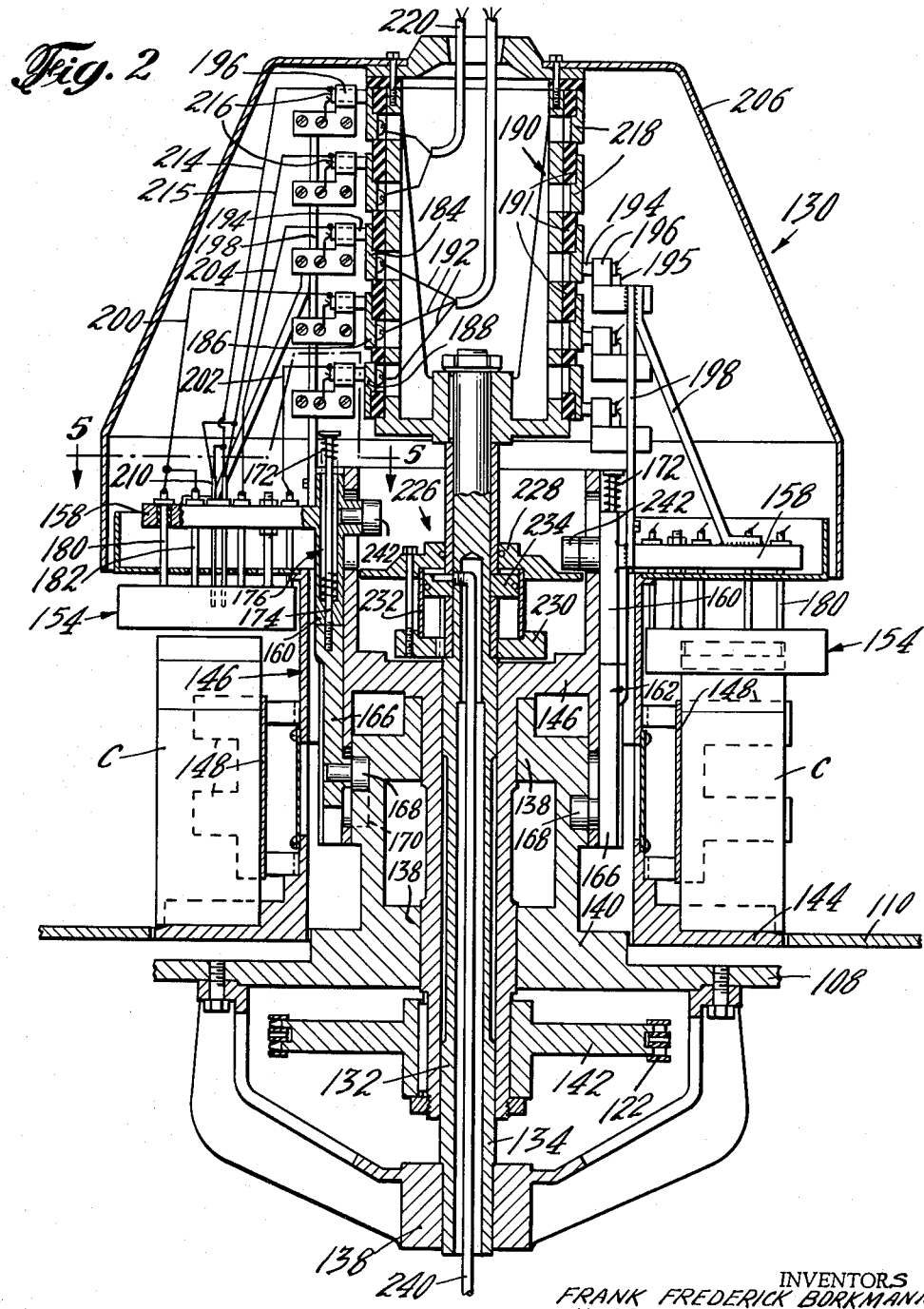
FIG. 2 is a vertical section through the heating turret of the instant machine, the view being taken substantially along the line 2—2 in FIG. 1.

As the carton C is propelled through its arcuate path of travel by its arm 114, it is brought into substantial tangential relationship to a seven pocket heating turret which is generally designated by the numeral 130, as best seen in FIGS. 1 and 2. The various operating parts of the heating turret 130 are carried on a vertical sleeve 132 which is rotatably mounted on a hollow stationary shaft 134, the bottom end of which is carried in a depending support bracket 136 which is carried by the main frame 108. The sleeve 132 is suitably journaled in spaced bearings 138 which are formed in an upwardly extending cylindrical support member 140 which forms a portion of the main machine frame 108 (see FIG. 2), the heating turret 130 being rotated in time with the feed spider 116 by the endless chain 122 which operates around a sprocket 142 which is keyed to the bottom end of the sleeve 132.

Figure 4:
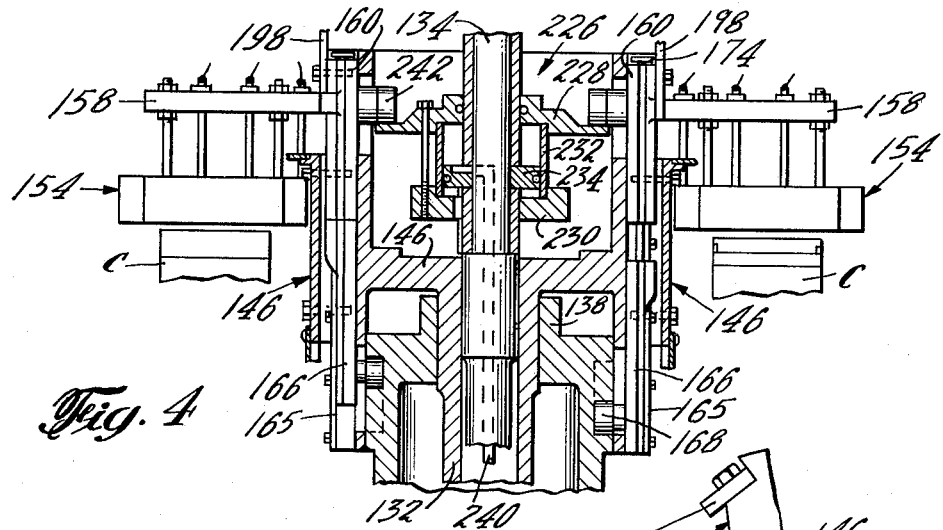
FIG. 4 is a sectional view of a portion of the mechanism of FIG. 2 but showing the heating heads held in raised, inoperative position by the safety device which prevents overheating of the cartons when the machine is shut down with cartons in it.

As the carton C moves into tangential relationship with the heating turret 130, it is disposed inwardly of a guide rail 143 and carried onto an annular support shelf 144 which is carried at the bottom of a turret cage assembly 146 which is secured to the top of and rotated with the turret sleeve 132, and which carries a plurality of carton receiving pockets 148, each of which is substantially U-shaped in horizontal cross-section and dimensioned to snugly receive a carton C from the feed turret 116, the U-shaped radial legs of each pocket 148 being flared as at 150 (see FIG. 4) to facilitate entry of the carton C.

As soon as the carton C has been fully seated in a pocket 148, a heating head, generally designated as 154, is moved downwardly so that it substantially encloses the upper end of the carton C to a depth substantially defined by the circumferential score line 64. A heating head 154 is provided for each pocket 148 of the heating turret 130, each head 154 being carried by a set of four studs which depend from a bracket plate 158 which extends outwardly from the upper portion 160 of a two-piece vertical slide assembly 162 which operates in a vertical slideway 164 which is formed in the cage assembly 146 (see FIG. 5), a pair of gib plates 165 being provided to retain the slide assembly 162 in the slideway 164. The bottom portion 166 of the slide assembly 162 carries a cam roller 168 which operates in a barrel type cam track 170 which is formed in the support member 140 and which reciprocates the slide 162, and consequently the heating head 154, in a vertical direction.

The upper and lower portions 160, 166 of the slide assembly 162 are normally held together by an expansion spring 172 which is positioned around a stud 174 which is threadedly secured in the bottom slide portion 166 and is disposed in a bore 176 which is formed in the upper slide portion 160, the spring 172 being confined between the head of the stud 174 and the bottom of the bore 176, as seen in the left hand portion of FIG. 2.

Figure 5:
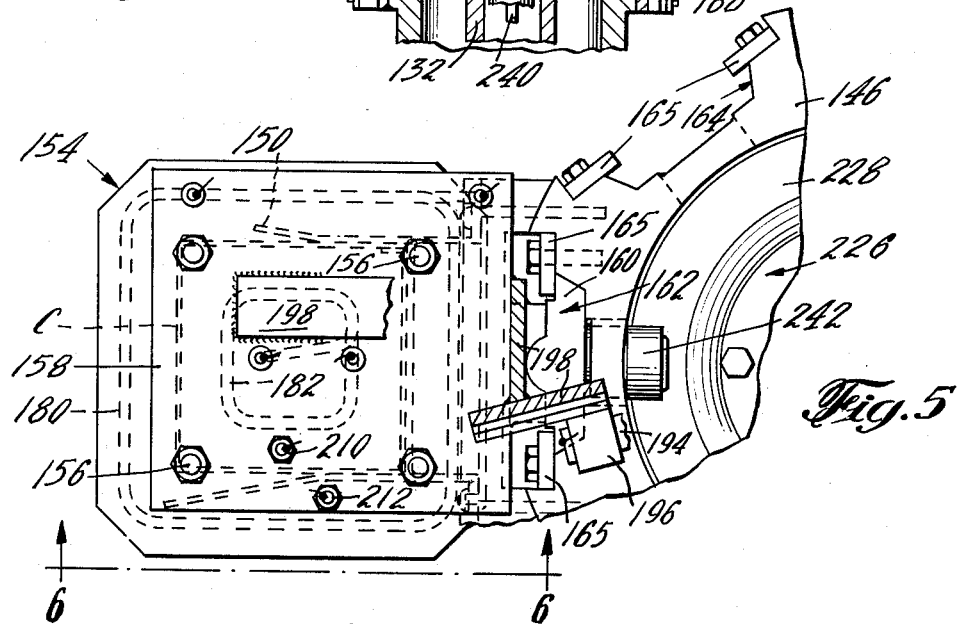
FIG. 5 is a horizontal section on an enlarged scale of one of the heating heads of the machine, the view being taken substantially along the line 5—5 in FIG. 2.
Figure 6:
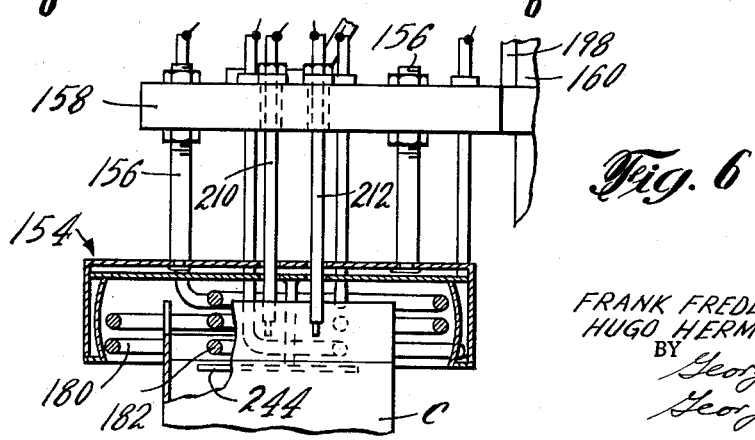
FIG. 6 is a side elevation taken substantially along the line 6—6 in FIG. 5.
Figure 9:
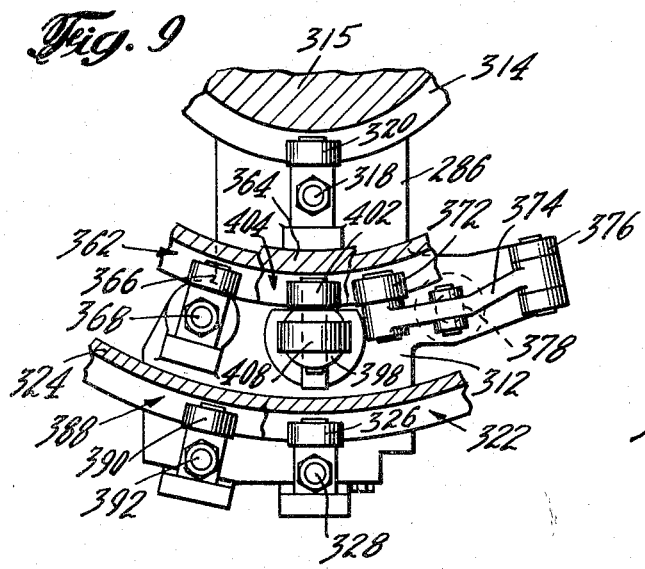

Each heating head 154 comprises a pair of spaced concentric heating coils 180, 182 which receive the tabs which comprise the top marginal portions of the carton C, the outer heating coil 180 being spaced outwardly of the carton and the inner coil 182 being disposed within the carton in spaced relationship thereto, as best seen in FIGS. 5 and 6.

The heating coils 180, 182 are preferably of the tubular, sealed electrical resistance type such as those which are commercially available under the trade mark "Calrod," and receive electrical energy through a group of three slip rings 184, 186, 188 which are mounted on a stationary collector frame 190 which is carried at the upper end of the stationary shaft 134, suitable insulating rings 191 being disposed between the slip rings 184, 186, 188 and the frame 190. The slip rings 184, 186, 188 are connected to a suitable source of current by three electrical conductor cables 192, and are connected to the coils 180, 182 through brushes 194 which are pressed against the slip rings by small springs 195 and are carried in brush holders 196 which are mounted on a vertical bracket 198 (see FIGS. 2 and 4), which is secured to and carried by the upper slide portion 160.

The brushes 194 are connected to the vertical ends of the heating coils 180, 182 by conductor cables 200, 202, 204, the cable 200 being a supply cable common to both coils 180, 182 (as seen in FIG. 2) and the cables 202, 204 being return cables which are respectively connected to the coils 180, 182. The whole upper portion of the heating turret 130 is preferably covered by a cover member 206.

As stated, the heating coils 180, 182 enclose the tabs 72, 74, 76, 78 and 80, which form the upper marginal portion of the carton C, and radiate heat directly onto these tabs to thereby melt the polyethylene coating which is carried on both the inside and outside surfaces of the tabs. The polyethylene normally has a melting point of 230° F. and it is thus desirable to raise its temperature above this point. However, it is undesirable to raise the temperature above 640° F., since above this temperature, oxidation which results in off-odors is encountered. The specific temperature required to produce satisfactory seals in the top closures of the cartons run in the instant machine is affected by a number of variables, so that no exact temperature can be specified herein. However, accurate control of the temperatures produced by the heating units is essential to produce good closures, and in order to obtain such control, a pair of temperature sensing thermocouples 210, 212 (see FIGS. 2, 5 and 6) are disposed in one of the heating heads 154, the thermocouple 210 being disposed adjacent the inner heating coil 182 and the thermocouple 212 being disposed adjacent the outer heating coil 180.

The thermocouples 210, 212 are preferably connected in parallel, and the average of their readings is utilized to indicate any necessary adjustments in the supply of current to the heating coils 180, 182 of the various heating heads 154. The circuit from these thermocouples 210, 212 is connected into the control panel (not shown) of the machine, through a pair of conductors 214, 215, a pair of brushes 216, a pair of slip rings 218 and a pair of leads 220, and the readings obtained from this thermocouple circuit is utilized in the usual manner to maintain the desired temperatures of the heating coils 180, 182.

Because of various unavoidable shut downs in carton filling and packing lines, it is sometimes necessary to stop the instant machine while cartons C are in the heating heads 154. In order to prevent overheating and burning of these cartons C, a safety device is provided which raises those heating heads 154 which are in their down position to remove them from heating proximity to the cartons C. This safety device comprises a vertically movable piston-like assembly, generally designated by the numeral 226 (see FIGS. 2, 4), which is mounted on the stationary shaft 134, and which comprises a top, horizontally extending annular plate 228, a bottom plate 230 and a connecting cylindrical wall 232 within which is disposed a stationary annular plate 234 which is fixedly secured to the shaft 134.

Whenever the instant machine is stopped, an electrical control circuit is actuated which opens a valve (not shown) to thereby introduce air into the interior of the safety device 226 between the annular plate 228 and the stationary plate 234 through an air supply pipe 240, thus forcing the parts 228, 230 and 232 upwardly and bringing the outer edge of the plate 228 into lifting engagement against a plurality of rollers 242 which are secured to the upper portions 160 of the vertical slides 162. As a result, these upper slide portions 160 of those slides 162 which are in down position are forced upwardly away from the lower slide portions 166 (which are held in down position by the cam track 170) against the compression of the springs 172 to thereby raise the heating heads 154 away from the cartons C (see FIG. 4).

When it is desired to restart the machine, the air supply pipe 240 is vented to the atmosphere and the pressure of the springs 172, together with gravity, causes the raised parts to move downwardly into their normal, operative position. However, since the normal heating and sealing cycles for the cartons C in the heating turret 130 is not provided when the machine is stopped, the cartons C in the machine at such time as it is stopped are preferably diverted onto an inspection table where the tightness of their top closures can be checked.

It will be obvious that the air can be supplied through the supply pipe 240 even while the machine is being run if it is desired for any reason to send cartons C through the machine without subjecting them to the heating operation.

As will hereinafter be described, it is desirable that the sealing bond in the top closure be effected only between mutually engaging portions of the carton tabs 72, 74, 76, 78, 80. It is very undesirable to heat the interior surfaces of any of the top panel portions 56, 58, 60, 62, since these panel portions must not be bonded together lest such bonding detract from the subsequent easy opening of the carton. In order to shield these lower interior surfaces of the panels 56, 58, 60, 62, a horizontal shielding plate 244 (see FIG. 6) is provided immediately adjacent the bottom of the inner heating coil 182 to prevent direct impingment of heat onto the interior surfaces of the cartons C below their crease lines 64.

After the heating cycle has been completed, the cam track 170 raises the heating head 154 clear of the upper end of the carton C and the carton C is stripped from its pocket 148 by a stripper rail 246 and is simultaneously engaged by an arm 248 of a second feed spider 250 which is mounted on a vertical shaft 252 journaled in bearings formed in the machine frame 108 (see FIG. 1).

The shaft 252 carries at its lower end a sprocket 254 which is engaged and driven by the endless chain 122. As the carton C is conveyed along the stripper rail 246, it is fed into a pocket 260 of a five pocket folding and sealing turret, which is generally designated by the numeral 262, and is mounted on a rotatable central sleeve 264 which is mounted on a stationary shaft 266, the bottom end of which is held in a bracket 268 which is secured to the main frame 108.

The sleeve 264 carries at its lower end a sprocket 270 which engages the endless chain 122. Adjacent the sprocket 270 and secured thereto is a large bevel gear 272 which is driven by a smaller bevel gear 274 which is carried at the end of a main drive shaft 276 which is driven from any suitable source of power, such as a drive motor (not shown).

The pockets 260 of the folding and sealing turret 262 are quite similar in construction to the pockets 148 of the heating turret 130, and comprise outwardly facing U-shaped members 278 having flared radial legs which snugly engage the sides of the cartons C. While in the pockets 260, the cartons C are supported on a support plate 280 which is carried by the bottom of a cylindrical sleeve 282 which depends from the lowermost of a pair of horizontal webs 284, 286 which project from the upper end of the sleeve 264, a hollow standard 288 being interposed between the sleeves 264, 282 to support the turret 262.

Mounted on the turret 262 above and in vertical alignment with each pocket 260 is a folding and sealing head 290 which functions to fold the upper end portions of the cartons C along the various crease lines and to press the heated tabs at the upper end of the carton into mutual engagement for a sufficient period of time to permit the melted polyethylene on the mutually engaged tab surfaces to fuse together and solidify to thereby create a liquidproof top closure.

As shown in FIG. 17, the carton C as received in the heating head 290 has its upper closure portions extending upwardly in substantially vertical alignment with the tubular carton body. It is frequently desirable to prefold these upper closure panels along their crease lines in a separate machine in order to break the fibres in the crease lines and thus condition the carton for the final folding and sealing operation which is performed in the instant machine. If this is done, the prefolded portions will not lie in flat planes as shown in FIG. 17, but will have an inwardly bent configuration which will be somewhat between the configurations shown in FIG. 17 and FIG. 18, being somewhat nearer to the showing of FIG. 17 than to that of FIG. 18.

This prefolding of the carton C does not require any changes to the instant machine, since prefolded cartons are insertable into the heating heads 154, and, regardless of whether the cartons are prefolded or not, the final closing of the carton C will be effected by the heads 290. Prefolding of the cartons C, however, is beneficial in that it insures a more reliable folding of the upper portions of the container along the crease lines.

Figure 3:
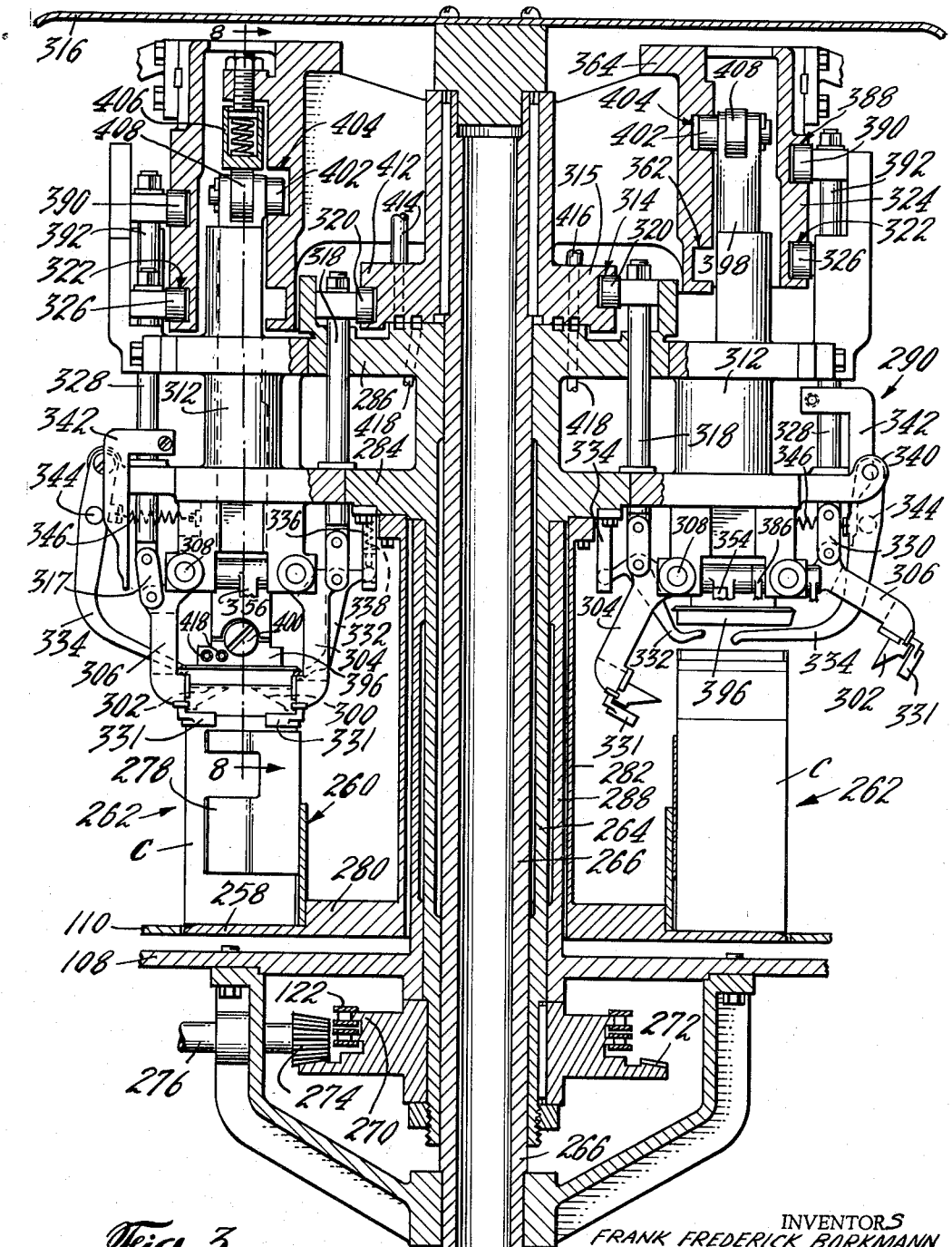
FIG. 3 is a vertical section through the folding and sealing turret of the instant machine, the view being taken substantially along the line 3—3 in FIG. 1.

As seen in the folding and sealing head 290 shown in the right hand side of FIG. 3, when the carton C is initially received in the folding and sealing turret 262, the various operating parts of the head 290 are in retracted position wherein they are clear of the carton C. As soon as the carton C is fully seated in a pocket 260, its oppositely disposed trapezodial panel portions 68 are engaged and pressed inwardly along the crease lines 54, 66 by a pair of wedge shaped folding anvils 300, 302 (see FIG. 3) which are carried at the bottom of the long arms of a pair of oppositely disposed bell cranks 304, 306 which are mounted on pivot pins 308 which are carried in bearings formed at the bottom of a body member 312 which is bolted into recesses which are formed in the webs 284, 286.

As seen in FIG. 20, the anvils 300, 302 are trapezoidal in vertical cross-section, and are formed with tapered side edges 313 (see FIG. 11) so that they fit fairly snugly within the recesses which are created in the top closure 86 as a result of the inward bending of the trapezoidal panels 68.

The bell crank 304 which carries the inner anvil 300 is actuated from the track 314 of a cam 315, which is carried at the upper end of the stationary shaft 266, which also carries a turret cover plate 316, through a pair of connecting links 317, a rod 318, and a cam roller 320. The bell crank 306 which carries the outer anvil 302 is actuated in a similar manner from the track 322 of a second cam 324 which is mounted outwardly of the cam 314. The cam roller 326 which operates in the track 322 is carried at the upper end of a rod 328 which is connected to the short arm of the bell crank 306 through a pair of connecting links 330. Each of the anvils 300, 302 carries a right angled corner guide 331 which cooperate to square up one side of the carton C (see FIGS. 3, 12, 15, 16).

As the anvils 300, 302 are moved towards each other to fold the trapezoidal panel sections 68 inwardly toward each other, the free tabs 76 of the carton C are folded outwardly away from each other along the crease line 64 by a pair of fingers 332, 334 which are moved in directions opposite the directions in which the anvils 300, 302 are moved and which engage against the upper edges of the free tabs 76.

The inner finger 332 is pivotally mounted, intermediate its ends, on the short arm of the bell crank 304 and its upper end is held against the bottom of a slotted bracket 336 by a spring 338. Consequently, downward movement of the rod 318 rocks the finger 332 in a direction opposite to that in which it rocks the anvil 300, the finger 332 operating in a slot formed in the long arm of the bell crank 304.

The outer finger 334 is pivotally mounted in a bearing 340 formed in the body member 312 and is actuated by a vertical cam 342 which is secured to the rod 328, a cam roller 344 being provided intermediate the ends of the finger 334 and held in engagement against the edge of the cam 342 by a spring 346. Thus, when the rod 328 moves downwardly to rock the anvil 302 toward the anvil 300, the cam 342 rocks the finger 334 in the opposite direction, this finger 334 operating in a slot formed in the bell crank 306 (see FIG. 11).

The initial position of the fingers 332, 334 is shown in dot and dash lines in FIG. 14, and the final position is shown in solid lines in the same figure, which also shows the anvils 300, 302 in their fully inward position. It will be noted that the lower portions of the bell cranks 304, 306 and the anvils 300, 302 are omitted in FIGS. 7 and 8.

As the panel portions 68 and the free tabs 76 are bent in the manner just described, the oppositely disposed closure panels 58, 62 are folded towards each other along the score line 54 by a pair of folding fingers 350, 352 (see FIGS. 7, 8, 15, 16) which are respectively carried at the lower ends of a pair of pivot arms 354, 356 (see FIG. 8) which are mounted on pivot pins 358, 360 which are journalled in bearings formed at the bottom of the body member 312 and disposed at right angles to the bearings in which the pins 308 are mounted (see FIG. 10).

The pivot arm 354 is actuated from a cam track 362 formed in a cam 364 which is concentric with and disposed inwardly of the cam 324, the motion imparted of the cam track 364 being transmitted to the pivot arm 354 through a cam roller which operates in the track 362, a rod 368, and a pair of connecting links 370 which are connected to the arm 354.

The pivot arm 356 is also actuated from the cam track 362, the motion imparted by the track 362 being transmitted to the arm 356 through a second cam roller 372 which operates in the track 362 (see FIG. 8) and is mounted at the leading end of an arm 374 which is pivotally mounted in an upright bracket 376 carried at the upper end of the body member 312 (see FIG. 8), the arm 374 being connected to the pivot arm 356 through a rod 378 and a pair of links 380.

The shapes of the cam tracks 314, 322, and 362 are such that the anvils 300, 302, the tab folding fingers 332, 334 and the panel folding fingers 350, 352 contact the upper closure portions of the carton C almost simultaneously to bend the trapezoidal panel portions 68 and the closure panels 58, 62 inwardly, and the free tabs 76 outwardly, past the position shown in FIG. 18 toward their fully folded position of FIG. 19. The movement of the finger 352 is, however, slightly behind that of finger 350 since its cam roller 372 follows the cam roller 366 of finger 350 in the cam track 362.

Just prior to the time the fully folded position of the closure portions is reached, the narrow underlap tab 78 and the long tabs 72 connected thereto are folded downwardly into overlapping relationship to the previously folded free tabs 76 but into underlapping relationship to the wide overlap tab 80 (see FIG. 15) and the short tabs 74 connected thereto by a small slide finger 382 which is mounted for reciprocal movement in a slideway 384 formed in the folding finger 350, as best seen in FIGS. 15 and 16. The slide 382 is actuated by a pivot arm 386, which is mounted on the pin 358 and in turn is controlled by a cam track 388 formed in the cam 324 above the cam track 322, the motion of cam track 388 being imparted to the pivot arm 386 via a cam roller 390, a rod 392, and a pair of connecting links 394. It will be noted that the anvils 300, 302, the bell cranks 304, 306, the slide finger 382, and the pivot arm 386 have been broken away in FIG. 3 for the sake of clarity.

As soon as the narrow underlap tab 78 has been folded, the slide finger 382 is retracted, and the upper surface of the overlap tab 80 is engaged by a hammer 396 which is mounted at the bottom of a heavy slide rod 398 on a pivot stud 400 which permits a limited pivotal action. The rod 398 is mounted on the body member 312, and at its upper end carries a cam roller 402 which operates in a cam track 404 is formed in the cam 364 above the cam track 362, the cam track 404 controlling the stroke of the hammer 396. However, as soon as the hammer 396 reaches the bottom of its stroke, the cam track 404 widens (see FIG. 3) and the hammer 396 is pressed downwardly against the top of the carton C under considerable pressure by a spring backed pressure track section 406 which is mounted directly above the rod 398 and which engages a roller 408 which is carried at the upper end of the rod 398 in vertical alignment therewith.

During the time this pressure is exerted on the hammer 396, the anvils 300, 302 are retained in their inward position. As a result, the free tabs 76, the tabs 72, 74, and the opposite end portions of the tabs 78, 80 are firmly compressed between the hammer 396 and the anvils 300, 302. Since the mutually engaging surfaces of these tabs are all coated with a polyethylene layer which has been melted and thus rendered soft and tacky in the heating turret 130, this polyethylene fuses together, the pressure on the tabs being held until the fused polyethylene sets and hardens to form a leakproof bond which gives to the upper portion of the carton C the final configuration of its top closure 86 as shown in FIG. 19.

To hasten the setting of the heated polyethylene, the hammer 396 preferably is cooled by water which is brought to a rotary grooved valve 412, formed between the upper web 286 and the cam 315, through a supply pipe 414 and carried from it by a dicharge pipe 416 (see FIG. 3), the valve 412 being connected to the hammers 396 in the several folding and sealing heads 290 by small tubes 418.

The carton C is held in squared-up position during the top forming operation by the previously described corner plates 331 which are carried by the anvils 300, 302 and by a U-shaped member 420 which is secured to and depends from the folding finger 350, as seen in FIGS. 7, 11, 12, 13, 15 and 16 and which engages the carton C in opposition to the corner plates 331 and cooperates therewith to accurately hold the carton C so that its squared shape is maintained.

The anvils 300, 302 also cooperate to maintain the various folded tabs in their desired positions, the upper surface of each anvil being formed with a step 422 which receives the folded free tab 76. Each anvil 300, 302 is also provided with a pair of side wings 424 having vertical faces which engage the edges of folded gable top of the carton C and hold it in squared-up position during the setting of the polyethylene.

After the top closure 86 has been completed, all of the various operating tools of the folding and sealing head 300 are retracted, and the carton C is stripped from the pocket 278 by a stripper rail 426 and fed by an arm 428 of a feed spider 430 onto a dicharge belt 432 which delivers it to any suitable place of deposit. The spider 430 is provided with a sprocket 434 which is driven by the endless chain 122 in time with the turret 262.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

We claim:

1. In a carton treating machine,
   a rotary turret,
   a plurality of heating heads mounted on said turret,
   each of said heating heads being mounted on a vertically reciprocable slide,
   a cam for reciprocating each of said slides once during each rotation of said turret to lower the heating head carried on said slide to operative position to perform a heating operation in a carton carried on said turret in vertical alignment with said heating head,
   and means for overriding the action of said cam to raise said heating heads when they are in lowered position in the event the machine is stopped to thereby prevent overheating and burning of the cartons.

2. The machine of claim 1 wherein each of said slides is composed of an upper and a lower section,
   the upper section carrying said heating head and the lower section carrying a cam roller which engages said cam,
   and wherein is provided a vertically movable piston which engages a portion of the upper section of each slide which is held in down position by said cam to thereby raise the upper sections of said slides to move the heating heads carried thereon to inoperative position.

3. A machine for forming a top closure in a carton having foldable top closure panels and tabs which are coated with a thermoplastic adhesive material,
   comprising heating means for heating said top closure tabs to soften the thermoplastic material thereon,
   folding and sealing means for folding said top closure panels and tabs to form them into a top closure wherein said heated tabs are disposed in mutually engaging overlapped relationship and for holding said overlapped tabs in pressured engagement until said softened thermoplastic material has set to form a sealed top closure,
   said folding and sealing means including a pair of oppositely disposed anvils,
   and means for moving said anvils inwardly toward each other for folding said top closure panels inwardly,
   said latter means also holding said anvils in inwardly disposed position to provide a support against which said overlapped tabs are pressed while said heated thermoplastic material is setting.

4. The machine of claim 3 wherein a tab folding finger is provided adjacent each anvil,
   said tab folding fingers being movable in directions opposite to the directions of movement of their associated anvils to fold a pair of tabs carried on the adjacent portions of said carton into outwardly extending position.

5. The machine of claim 4 wherein a pair of panel folding fingers are provided for movement toward each other at right angles to the direction of movement of said anvils and tab folding fingers.

6. The mechaine of claim 5 wherein one of said panel folding fingers carries a tucking slide which tucks a tab carried on one side of said carton into underlapping position relative to a tab carried on the opposite side of said carton but into overlapping relationship relative to said outwardly extending tabs.

7. The machine of claim 6 wherein a hammer is provided to press said overlapped tabs against said anvils.

8. The machine of claim 7 wherein said hammer is cooled to expedite the setting of the heated thermoplastic material on said tabs.

9. The machine of claim 8 wherein said anvils, said tab folding fingers, said panel folding fingers, said slide, and said hammer together comprise a single folding and sealing head.

10. The machine of claim 9 wherein said anvils, said tab folding fingers, and said panel folding fingers are pivotally mounted in said head.

11. The machine of claim 9 wherein said folding and sealing head is carried on a rotary turret.

12. The machine of claim 11 wherein said rotary turret carries a plurality of said folding and sealing heads.

13. In a carton treating machine,
    a heating head for heating selected areas of the top closure portions of a filled carton,
    said heating head comprising a pair of spaced, substantially concentric, electrical heating coils which are initially disposed above said carton,
    means for providing relative vertical movement between said carton and said heating head to position the upper end of said carton in the space between said heating coils so that one of said heating coils is disposed within the upper end of said carton and the other of said heating coils surrounds the upper end of said carton, and
    shielding means disposed below said heating coil which is disposed within said carton to confine the direct application of heat to predetermined portions of the inner surface of said carton.

14. In a carton treating machine,
    a heating head for heating selected areas of the top closure portions of a filled carton,
    said heating had comprising a pair of spaced, substantially concentric, electrical heating coils,
    a vertically movable slide on which said heating head is mounted,
    means for reciprocating said slide to position the upper end of said carton in the space between said heating coils so that one of said heating coils is disposed within the upper end of said carton and the other of said heating coils surrounds the upper end of said carton,
    said head when in raised position being disposed in inoperative position above said carton and when in lowered position being in operative position wherein it encloses the upper end of said carton,
    said slide comprising an upper and a lower section,
    said heating head being secured to said upper section,
    said lower section being engageable with and actuated by said slide reciprocating means, and
    said upper section of said slide being movable vertically relative to said lower section when the latter is held in lowered position by said slide reciprocating means.

15. In a carton treating machine,
    a movable conveyor,
    a heating head mounted on said conveyor for vertically reciprocable movement thereon,
    means for reciprocating said heating head to lower it to operative position to perform a heating operation on a carton carried on said conveyor in vertical alignment with said heating head, and
    means for overriding the action of said reciprocating means to raise said heating head when it is in a lowered position in the event the machine is stopped to thereby prevent overheating and burning of the carton.

References Cited by the Examiner

UNITED STATES PATENTS

| | | | |
|---|---|---|---|
| 2,106,739 | 2/38 | Harrison | 53—141 X |
| 2,426,555 | 8/47 | Jacobs et al. | 53—22 |
| 2,669,815 | 2/54 | Zinn et al. | 53—375 X |
| 3,064,542 | 11/62 | Terry | 93—44.1 |

FRANK E. BAILEY, *Primary Examiner.*

TRAVIS S. McGEHEE, *Examiner.*